350-392
PTU40 XR 3,868,608 SR

[11] 3,868,608
[45] Feb. 25, 1975

Williams

[54] SURFACE WAVE FILTER

[75] Inventor: G. Norman Williams, Seneca Falls, N.Y.

[73] Assignee: GTE Sylvania Incorporated, Stamford, Conn.

[22] Filed: Apr. 1, 1974

[21] Appl. No.: 457,060

[52] U.S. Cl. .................... 333/72, 310/9.8, 330/174, 330/185, 333/30 R
[51] Int. Cl. ....... H03h 9/02, H03h 9/26, H03h 9/30
[58] Field of Search ............ 333/30 R, 72; 330/174, 330/185, 31, 147; 310/8, 8.1, 9.7, 9.8

[56] References Cited

UNITED STATES PATENTS 3,665,211 5/1972 Owens et al. .................... 310/8.1 X
3,750,027 7/1973 Hartmann ..................... 333/30 R X

*Primary Examiner*—James W. Lawrence
*Assistant Examiner*—Marvin Nussbaum
*Attorney, Agent, or Firm*—Norman J. O'Malley; Robert E. Walrath; Cyril A. Krenzer

[57] ABSTRACT

A surface wave filter with symmetrical input and output transducers is shown. The input transducer has mirror image symmetry about a center line. The output transducers have mirror image symmetry about a line displaced one-fourth wavelength from the center line of the input transducer to provide differential output signals.

7 Claims, 3 Drawing Figures

SURFACE WAVE FILTER

BACKGROUND OF THE INVENTION

This invention relates to surface wave filters and more particularly to symmetrical surface wave filters.

A large number of designs for surface wave filters have been proposed in the prior art. Such surface wave filters typically include an input transducer and one or more output transducers deposited on a piezoelectric substrate. Each of the transducers includes a pair of interleaved comb-shaped electrodes of conductive teeth. An input signal is applied to the input transducer either differentially or to one of the pair of combs with the other comb being grounded. The input transducer launches a wave along the surface of the substrate.

The surface wave launched by the input transducer excites the output transducer or transducers. The output signal is taken from the output transducer either differentially or from one of the pair of combs with the other comb being grounded. Since the input transducer launches surface waves which travel in both directions from the center, two output transducers can be conveniently arranged on opposite sides of the input transducer. With proper design and placement of the output transducers, either in phase or differential output signals can be provided.

The idealized frequency response of a transducer is given by $f(X) = (\sin X/X)^2$ where $X = n\pi(f-f_0)/f_0$ in which $n$ is the number of pairs of fingers in the transducer and $f_0$ is the synchronous frequency, $v/\lambda$, wherein v is the average velocity of the surface wave and λ is the period of the transducer. While the above equations describe an idealized response, various parasitic effects cause the actual response to deviate from the idealized response. Such parasitic effects include bulk wave coupling, inductive coupling, and capacitive coupling between the input and output transducers.

In various applications of surface wave filters, the zeros of the response are arranged to attenuate selected frequencies. For example, in intermediate frequency amplifiers such as are used in television receivers, the zeros are arranged to attenuate frequencies at adjacent channel carriers. It has been found, however, in known prior art surface wave filters that insufficient attenuation is obtained at certain frequencies due to one or more of the above-noted parasitic effects.

OBJECTS AND BACKGROUND OF THE INVENTION

Accordingly, it is an object of this invention to obviate the above-noted disadvantages of the prior art.

It is a further object of this invention to provide a new and novel surface wave filter.

It is a further object of this invention to provide a new and novel surface wave filter for use in a frequency selective circuit for an intermediate frequency amplifier.

It is a still further object of this invention to provide a surface wave filter with a high degree of symmetry.

It is a yet further object of this invention to provide a symmetrical surface wave filter which exhibits improved attenuation at preselected frequencies.

In one aspect of this invention the above and other objects and advantages are achieved in a surface wave filter which includes an input transducer and first and second output transducers deposited on a substrate of piezoelectric material. The input transducer has an input comb of electrodes and a common comb of electrodes with mirror image symmetry about a center line. Each of the output transducers is deposited on opposite sides of the input transducer and each has a common comb of electrodes and an output comb of electrodes with mirror image symmetry about a line displaced an integral number of wavelengths plus or minus one-fourth wavelength from the center line of the input transducer.

DETAILED DESCRIPTION OF THE PREFERRED EMBODIMENTS

For a better understanding of the present invention, together with other and further objects, advantages, and capabilities thereof, reference is made to the following disclosure and appended claims in connection with the accompanying drawings.

Figure 1:
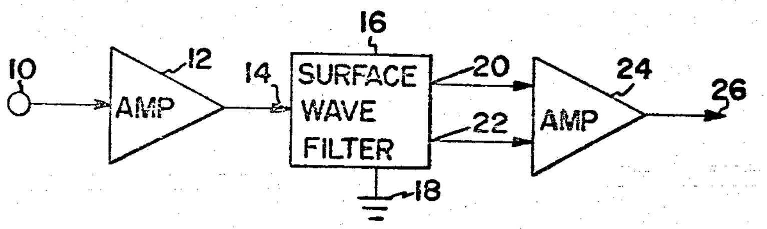
FIG. 1 is a block diagram of an intermediate frequency amplifier including the invention.

In FIG. 1 an input terminal 10 is connected to an input of an amplifier 12 which has an output connected to an input 14 of a surface wave filter 16. Surface wave filter 16 has a common terminal illustrated as being connected to a common conductor or circuit ground 18. First and second output terminals 20 and 22 of surface wave filter 16 are connected to first and second inputs of an amplifier 24 which has an output connected to an output terminal 26.

For purposes of explanation it will be assumed that the block diagram of FIG. 1 represents an intermediate frequency amplifier for a television receiver. Those skilled in the art will realize, however, that the invention may be used in other applications as well. Input signals applied to terminal 10, which can be connected to the output of an RF tuner, are amplified by amplifier 12 and applied to input terminal 14 of surface wave filter 16. Typical intermediate frequency amplifiers include frequency selective circuits which in FIG. 1 includes surface wave filter 16. Amplifier 24 amplifies output signals from surface wave filter 16 and in the preferred embodiment is a differential amplifier. The output signal at terminal 26 may be applied to a detector. Additional stages of surface wave filter and/or amplification can be included in the intermediate frequency amplifier, if desired. The overall frequency response of the frequency selective circuit including surface wave filter 16 and amplifiers 12 and 24 is a typical band pass frequency response such as is used in the intermediate frequency amplifiers of television receivers.

Figure 2:
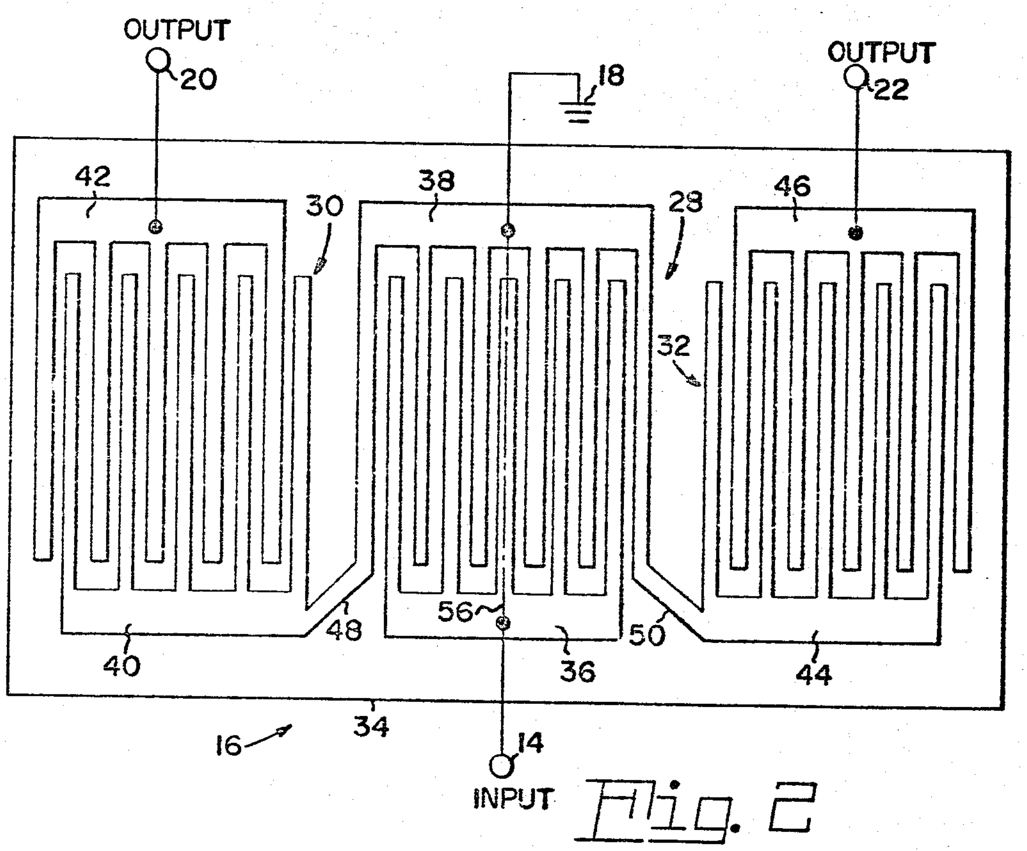
FIG. 2 is a schematic diagram of one embodiment of the invention.

FIG. 2 illustrates one embodiment of a surface wave filter 16 in accordance with the invention. An input transducer 28 and first and second output transducers 30 and 32 are deposited on a substrate 34 of piezoelectric material. The particular piezoelectric material used will be in part a function of the application of the invention and the frequency ranges of interest. Such materials as PZT, quartz, lithium niobate, lithium tantalate, zinc oxide, zinc sulfide, cadmium sulfide, and others will propogate accoustic waves across their surface and accordingly can be used as substrate 34. Lithium niobate has been found to be particularly advantageous for use in television receiver intermediate frequency amplifiers.

In the preferred embodiment input transducer 28 includes an input comb of electrodes 36 having a plurality of electrically conductive fingers and a common or grounded comb of electrodes 38 having a plurality of electrically conductive fingers. The fingers of combs 36 and 38 are interleaved to form interdigital transducer 28. Comb 36 is connected to input terminal 14 and comb 38 is connected to circuit ground 18.

Output transducer 30 has a common or grounded comb of electrodes 40 and an output comb of electrodes 42 illustrated as being connected to output terminal 20. Combs 40 and 42 each include a plurality of electrically conductive fingers interleaved to form interdigital transducer 30. Similarly, output transducer 32 has a common or grounded comb of electrodes 44 and an output comb of electrodes 46 illustrated as being connected to output terminal 22. Combs 44 and 46 each include a plurality of electrically conductive fingers interleaved to form interdigital transducer 32. In the illustrated embodiment the common or ground connections to combs 40 and 44 of output transducers 30 and 32 are made by conductors 48 and 50 deposited on substrate 34 and connected from the extremities of the outboard fingers of comb 38 to the bus bars or bases of combs 40 and 44 of output transducers 30 and 32. It should be noted that the ground connections can alternatively be made from the bus bar of comb 38 to the extremities of the outboard fingers of combs 40 and 44.

Figure 3:
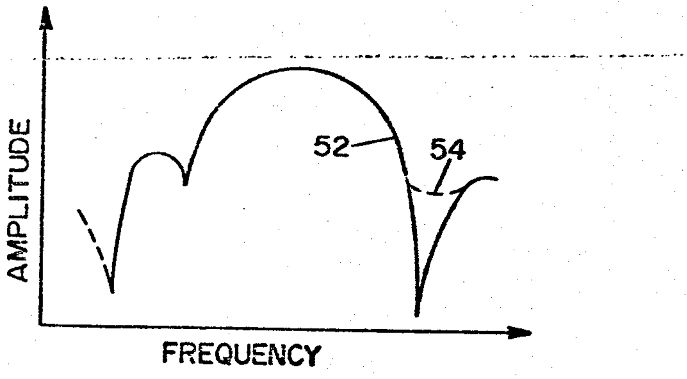
FIG. 3 is a graph to aid in further illustrating the advantages obtained from the invention.

FIG. 3 is a plot of amplitude versus frequency for a typical intermediate frequency amplifier such as is used in television receivers. The substrate orientation and thickness, width of the fingers, spacing between fingers, numbers of fingers, and spacing between transducers of surface wave filter 16 are selected to provide the desired frequency response. For example, in a particular design the predicted or theoretical response is illustrated by solid line curve 52 of FIG. 3. Known prior art surface wave filters, however, deviate from the predicted response and provide an actual response which follows, for example, dashed line curve 54 thereby providing insufficient attenuation of signals in the adjacent higher frequency channel. It has been found that various parasitic effects such as capacitive coupling between the input and the output transducers of the surface wave filter cause this deviation from the predicted response. It has also been found that the substrate thickness has an effect on the deviation such that for applications where a thin substrate is desired to obtain other advantages, acceptable devices are difficult or impossible to fabricate. For example, the bulk wave effect increases greatly when the substrate thickness is reduced from about twenty-two mils to about eight mils. It has further been found that providing complete or mirror image symmetry sufficiently balances the parasitic effects between the two output signals at terminals 20 and 22 such that the effect thereof can be eliminated.

In FIG. 2 input transducer 28 possesses mirror image symmetry about center line 56. If output transducers 30 and 32 also possess mirror image symmetry about center line 56, the output signal at terminals 20 and 22 will be in phase. Furthermore, parasitic coupling between input transducer 28 and output transducers 30 and 32 will provide indentical signals at terminals 20 and 22.

To obtain output signals at terminals 20 and 22 which are differential or 180° out of phase, one of transducers 30 and 32 is displaced one-half wavelength with respect to the other output transducer. This slight displacement in spacing causes a slight unbalance in the parasitic coupling, however, it has been found that this slight unbalance does not deleteriously affect the operation of surface wave filter 16. Accordingly, the output signals at terminals 20 and 22 are differential or 180° out of phase and when applied to differential amplifier 24, the signal components due to parasitic coupling are cancelled by common mode rejection. Accordingly, output transducers 30 and 32 possess mirror image symmetry about a line parallel to center line 56. Since one of output transducers 30 and 32 is displaced by one-half wavelength, their line of symmetry is one-fourth wavelength from center line 56. In general, the line of symmetry of output transducers 30 and 32 is displaced an integral number of wavelengths plus or minus one-fourth wavelength from center line 56. However, as the number of wavelengths increases, the parasitic coupling becomes more unbalanced, and accordingly, in the preferred embodiment the displacement is one-fourth wavelength. In some designs intentional small deviations from strict mirror image symmetry may be introduced to obtain a desired response. Such deviations can include slight differences in widths or spacing between fingers from the input to output transducers or between the output transducers. These deviations from strict mirror image symmetry are insufficient, however, to substantially unbalance the response due to the various parasitic effects. Accordingly, the term mirror image symmetry includes transducers with such small deviations.

It should be noted that while comb 36 is shown with an odd number of fingers and comb 38 is shown with an even number of fingers, the number of fingers for each comb can be even or odd and will generally be much larger than that illustrated. Similarly, the number of fingers in the combs of output transducers 30 and 32 can be either even or odd and will be typically much larger than the number illustrated. The combs of output transducers 30 and 32 can also be arranged such that fingers of output combs 42 and 46 are closest to input transducer 28. Also, the outboard fingers of transducer 28 can be part of comb 36 instead of comb 38.

While there has been shown and described what is at present considered the preferred embodiment of the invention, it will be obvious to those skilled in the art that various changes and modifications may be made therein without departing from the scope of the invention as defined by the appended claims.

What is claimed is:

1. A surface wave filter comprising:

a substrate of piezoelectric material;

an input transducer deposited on said substrate and having an input comb of electrodes and a common comb of electrodes with mirror image symmetry about a center line; and first and second output transducers deposited on said substrate on opposite sides of said input transducer and each having a common comb of electrodes and an output comb of electrodes with mirror image symmetry about a line displaced an integral number of wavelengths plus or minus one-fourth wavelength from said center line.

2. A surface wave filter as defined in claim 1 including conductor means deposited on said substrate connecting said common comb of said input transducer to each of said common combs of said output transducers.

3. A surface wave filter as defined in claim 2 wherein the line of symmetry of said output transducers is displaced one-fourth wavelength from said center line.

4. In a frequency selective circuit for an intermediate frequency amplifier, a surface wave filter comprising:

a substrate of piezoelectric material;

an input transducer having an input comb of electrodes and a common comb of electrodes deposited on said substrate with mirror image symmetry about a center line; and first and second output transducers each having a common comb of electrodes and an output comb of electrodes deposited on said substrate on opposite sides of said input transducer with mirror image symmetry about a line displaced an integral number of wavelengths plus or minus one-fourth wavelength from said center line.

5. A surface wave filter as defined in claim 4 including conductor means deposited on said substrate connecting said common comb of said input transducer to each of said common combs of said output transducers.

6. A surface wave filter as defined in claim 4 wherein the line of symmetry of said output transducers is displaced one-fourth wavelength from said center line.

7. A surface wave filter as defined in claim 6 wherein said intermediate frequency amplifier includes a differential amplifier connected to said first and second output transducers for rejecting common mode signals from said first and second output transducers.

* * * * *